US008918830B2

(12) United States Patent
Patry et al.

(10) Patent No.: US 8,918,830 B2
(45) Date of Patent: Dec. 23, 2014

(54) METHOD FOR DOWNLOADING DATA PRECEDED BY INFORMATION SIGNALS

(75) Inventors: Nadine Patry, Rennes (FR); Louis-Xavier Carbonnel, Rennes (FR); Eric Gautier, Rennes (FR); Laurent Lesenne, Acigné (FR); François Roudier, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 2745 days.

(21) Appl. No.: 10/168,930

(22) PCT Filed: Dec. 29, 2000

(86) PCT No.: PCT/FR00/03739
§ 371 (c)(1),
(2), (4) Date: Sep. 23, 2002

(87) PCT Pub. No.: WO01/50762
PCT Pub. Date: Jul. 12, 2001

(65) Prior Publication Data
US 2003/0041335 A1 Feb. 27, 2003

(30) Foreign Application Priority Data

Dec. 30, 1999 (FR) ...................................... 99 16746
Feb. 23, 2000 (FR) ...................................... 00 02257

(51) Int. Cl.
*H04N 7/173* (2011.01)
*H04N 21/258* (2011.01)
(Continued)

(52) U.S. Cl.
CPC ... *H04N 21/26291* (2013.01); *H04N 21/25808* (2013.01); *H04N 21/235* (2013.01); *H04N*
(Continued)

(58) Field of Classification Search
USPC .......................... 725/116, 132, 140, 146, 152; 717/168–173
See application file for complete search history.

(56) References Cited

U.S. PATENT DOCUMENTS 5,440,632 A     8/1995   Bacon et al. .................... 380/20
5,553,083 A *   9/1996   Miller ........................... 714/748
(Continued)

FOREIGN PATENT DOCUMENTS

EP     97/30549     8/1997   ............... H04N 7/10
EP     0823815      1/1998   ............. H04N 5/445
(Continued)

OTHER PUBLICATIONS http://www.atvef.com/library/spec1_1a.html, "Advanced Television Enhancement Forum Specification (ATVF)", Version 1.1 revision 26, Feb. 2, 1999, pp. 1-34.

*Primary Examiner* — Jason Salce
(74) *Attorney, Agent, or Firm* — Vincent E. Duffy; Joel M. Fogelson

(57) ABSTRACT

The invention relates to a process for transmitting and a process for receiving update data. According to the invention, the update data are dispatched by a communication center to terminals with the aid of a broadcasting network. Next, the terminals report their update to the center through a bidirectional network. The center renews the campaign or stops the current campaign as a function of the number of terminals updated. When only a minimum number of terminals to be updated remains, the campaign is stopped, the last terminals not updated will be so via the bidirectional link.
The invention also relates to the center implementing a dispatch process and the receiver for receiving and processing the update data.

10 Claims, 10 Drawing Sheets

(51) Int. Cl.
*H04N 21/235* (2011.01)
*H04N 21/475* (2011.01)
*H04N 21/435* (2011.01)
*H04N 21/6583* (2011.01)
*H04N 21/81* (2011.01)
*H04N 21/84* (2011.01)
*H04N 21/262* (2011.01)
*H04N 21/488* (2011.01)
*H04N 21/6377* (2011.01)
*H04N 21/426* (2011.01)
*H04N 21/45* (2011.01)
*H04N 21/8355* (2011.01)
*H04N 21/454* (2011.01)
*H04N 21/658* (2011.01)

(52) U.S. Cl.
CPC .. 21/4758 (2013.01); *H04N 21/435* (2013.01); *H04N 221/6582* (2013.01); *H04N 21/6583* (2013.01); *H04N 21/8166* (2013.01); *H04N 21/8402* (2013.01); *H04N 21/8133* (2013.01); *H04N 21/4882* (2013.01); *H04N 21/6377* (2013.01); *H04N 21/42684* (2013.01); *H04N 21/4516* (2013.01); *H04N 21/8355* (2013.01); *H04N 21/454* (2013.01); *H04N 21/658* (2013.01); *H04N 7/17318* (2013.01)
USPC ........... 725/132; 725/116; 725/140; 725/146; 725/152; 717/168; 717/169; 717/170; 717/171; 717/172; 717/173

(56) References Cited

U.S. PATENT DOCUMENTS

| | | | | |
|---|---|---|---|---|
| 5,734,589 | A | | 3/1998 | Kostreski et al. ......... 364/514 A |
| 5,764,992 | A | * | 6/1998 | Kullick et al. ................ 717/170 |
| 5,768,539 | A | | 6/1998 | Metz et al. ............... 395/200.79 |
| 5,845,077 | A | * | 12/1998 | Fawcett ....................... 709/221 |
| 6,074,434 | A | * | 6/2000 | Cole et al. .................... 717/173 |
| 6,088,722 | A | | 7/2000 | Herz et al. |
| 6,151,643 | A | * | 11/2000 | Cheng et al. .................... 710/36 |
| 6,522,342 | B1 | | 2/2003 | Gagnon et al. |
| 6,532,495 | B1 | * | 3/2003 | Welles et al. ................. 709/232 |
| 6,532,591 | B1 | * | 3/2003 | Arai et al. ..................... 725/132 |
| 6,834,110 | B1 | | 12/2004 | Marconcini et al. |
| 7,003,546 | B1 | * | 2/2006 | Cheah .......................... 709/200 |
| 7,020,893 | B2 | | 3/2006 | Connelly |

FOREIGN PATENT DOCUMENTS

| | | | |
|---|---|---|---|
| EP | 0905984 | 3/1999 | ............ H04N 7/52 |
| EP | 0926862 | 6/1999 | ............ H04L 29/00 |
| JP | 5219056 | 8/1993 | |
| JP | 9319572 | 12/1997 | |
| JP | H09319572 | 12/1997 | |
| JP | H1091453 | 4/1998 | |
| JP | 11134238 | 5/1999 | |
| JP | H11134238 | 5/1999 | |
| JP | 11272453 | 10/1999 | |
| JP | H11272453 | 10/1999 | |
| WO | 9730549 A1 | 8/1997 | |
| WO | WO9857497 | 12/1998 | |
| WO | WO9935844 | 7/1999 | |

\* cited by examiner

| TA | V3 | TD1$_A$,TF1$_A$ | RZ3 | ON |

Figure 7 - a
Figure 7 - b
Figure 7 - c
Figure 7 - d
Figure 7 - e
Figure 7 - f

| TA | V3 | TD1$_A$,TF1$_A$ | RZ3 | ON | TB | V6 | TD1$_B$,TF1$_B$ | RZ5 | ON |

Figure 8 - a

| TA | V3 | TEL | ON | TB | V6 | TD2$_B$,TF2$_B$ | RZ5 | ON |

Figure 8 - b

| TA | V3 | TEL | ON | TB | V6 | TEL | ON |

Figure 8 - c

| Ti | V3 | TD$_1$,TF$_1$ | RZ4 | ON |

Figure 9

| TA | V3 | TD1$_A$,TF1$_A$ | RZ3 | TEL | ON |

Figure 12

ND SIGNALS

This application claims the benefit, under 35 U.S.C. §365 of International Application PCT/FR00/03739, filed Dec. 29, 2000, which was published in accordance with PCT Article 21(2) on Jul. 12, 2001 in French and which claims the benefit of French patent application No. 9916746 filed Dec. 30, 1999 and French patent application No. 0002257 filed Feb. 23, 2000.

BACKGROUND

1. Field of Invention

The invention relates to a process for downloading data intended for updating appliances or for giving the appliances new functions, the data being dispatched by a communication center.

The invention applies more especially to the sending of programs to be downloaded into the memory of appliances which are typically television video decoder receivers.

2. Description of Related Art

These appliances, which hereinbelow will be referred to more simply as "decoders", receive signals broadcast by a satellite or a hertzian network or an optical cable (coaxial or optical). The mode of transmission by the broadcasting network is unidirectional. The signals broadcast represent pictures and sound destined for the television and digital information destined for the decoders. The broadcasting network consists of several broadcasting channels. A channel is a means of acquiring information continuously through a means of communication. For an analog television, the channels are frequency bands allotted to the broadcasting of a station. In this case, the digital information is broadcast during the frame flyback or "VBI". For a digital television, the channels are data streams having the same program identifier, a second level of identification makes it possible to distinguish the audio-visual data from the digital information. This information constitutes interactive services, teletext or else data for updating the software of the decoder, etc.

A decoder comprises a central unit which executes software stored in a read-only memory and/or in a nonvolatile programmable memory. It is generally furnished with an interface for bidirectional dialog, more commonly referred to as a "return path", which makes it possible to establish a specific link with the communication center. This interface is typically a modem linked to the switched network.

The information received by the broadcasting network is in particular the update data, the latter making it possible to upgrade the functionalities of the decoder. They are stored in the programmable memory. The automatic downloading of the update data performed during an update campaign avoids the need for manual interventions by the user on the decoder. These data are sent repetitively during sessions.

The main function of a decoder is to offer the user pictures and interactive services. The downloading of the update data is a secondary and hence nonpriority task. The resources of a decoder do not necessarily make it possible to manage both interactive services and the downloading of update data. It is therefore necessary to find a solution that makes it possible to perform downloading while inconveniencing the user as little as possible. The systematic downloading of the data via the return path cannot be envisaged since it generally has a more limited bandwidth than that of the broadcasting network and the use of a leased line costs money. The invention proposes a flexible way of downloading update data by tailoring the resources of the decoder so as to inconvenience the user as little as possible.

SUMMARY OF THE INVENTION

Accordingly, the subject of the invention is a process for transmitting update data by a communication center to a plurality of terminals, characterized in that it comprises the following steps:

broadcasting of an update campaign consisting in dispatching update data;

of formulating of a bidirectional communication between the center and at least some of the terminals, each terminal transmitting an indication of the state of its update to the center;

determining of the number of updated terminal at the level of the center of the number of terminals actually updated;

as a function of the number of terminals updated, halting or triggering of a new update campaign;

transmission by a point-to-point link of the update data from the center to a terminal subsequent to the dispatching by this terminal of the absence of update indication.

In this manner, the center can ascertain the number of terminals actually updated. If this number is sufficient, the center can stop the current update campaign or, on the contrary, if on completion of the current campaign this number is insufficient, the center can initiate a new campaign. If, following successive update campaigns, only a small number of nonupdated terminals remains, the latter will be so in the course of a particular communication with the aid of the point-by-point link. This avoids continued use of the bandwidth to dispatch data destined for a small number of terminals.

The subject of the invention is also a process for receiving update data dispatched by a communication center to terminals, the center broadcasting an update campaign in the course of which some terminals receive and store the update data, characterized in that it furthermore comprises, subsequent to the actual updating of a terminal, a step of transmission from the receiver to the center of a signal of proper running of the operation, and of a step of reception via a point-to-point link of the update data from the center to a terminal subsequent to the dispatching by this terminal of the absence of update indication.

In this manner, the terminals advise the center of the state of update of the stock of terminals, and can receive the update data via the point-to-point link.

The subject of the present invention is also the communication center and the receiver terminals designed to implement the processes cited above.

BRIEF DESCRIPTION OF THE DRAWINGS

Other characteristics and advantages of the invention will become apparent through the description of a particular non-limiting exemplary embodiment of the invention.

FIG. 7 shows the progression of the version of two groups of decoders during an update campaign.

FIG. 8 shows the progression of the content of the announcement signals during an update campaign for two groups of decoders.

FIG. 9 shows the data of an announcement signal according to a variant of the invention.

FIG. 12 shows the data of an announcement signal according to a variant of the invention.

DETAILED DESCRIPTION

Figure 1:
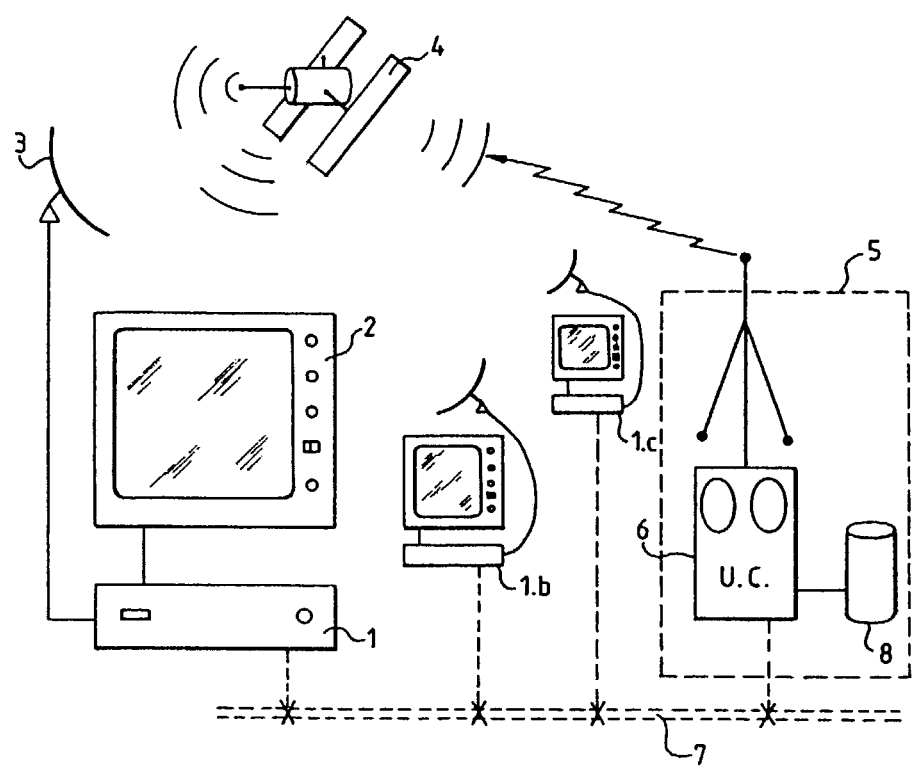
FIG. 1 diagrammatically represents a communication system according to the invention.

The diagram of FIG. 1 shows the elements of a communication system implementing the invention. The decoders (1-*a*, 1-*b*, 1-*c*) pick up the video signals with the aid of an antenna (3), which is parabolic for example. These video signals are transmitted by a satellite (4) or hertzian relays. They can also be transmitted with the aid of a cable or of any other means of communication whose bit rate is big enough. The signals are also received by the television (2). The information contained in the audio-video signals originates from a communication center (5) furnished with a central unit (6). The information of the audio-video signals represents pictures destined for the television and information destined for the decoders such as interactive services, teletext or data for updating the software of the decoder. The insertion of such information is a technique well known per se by the person skilled in the art. Within the area of analog televisions, for example, the information is sent in the form of data packets during the frame flyback or "VBI", between picture signals. The decoders are generally linked by a bidirectional path to the switched telephone network (7) termed the "return path" or VR. This path can also be embodied with the aid of the cable cited above or of any other means available to the person skilled in the art, RF links for example. The central unit of the center (6) is also connected to the path (7). The communication center possesses a memory (8), containing information relating to each decoder.

Figure 2:
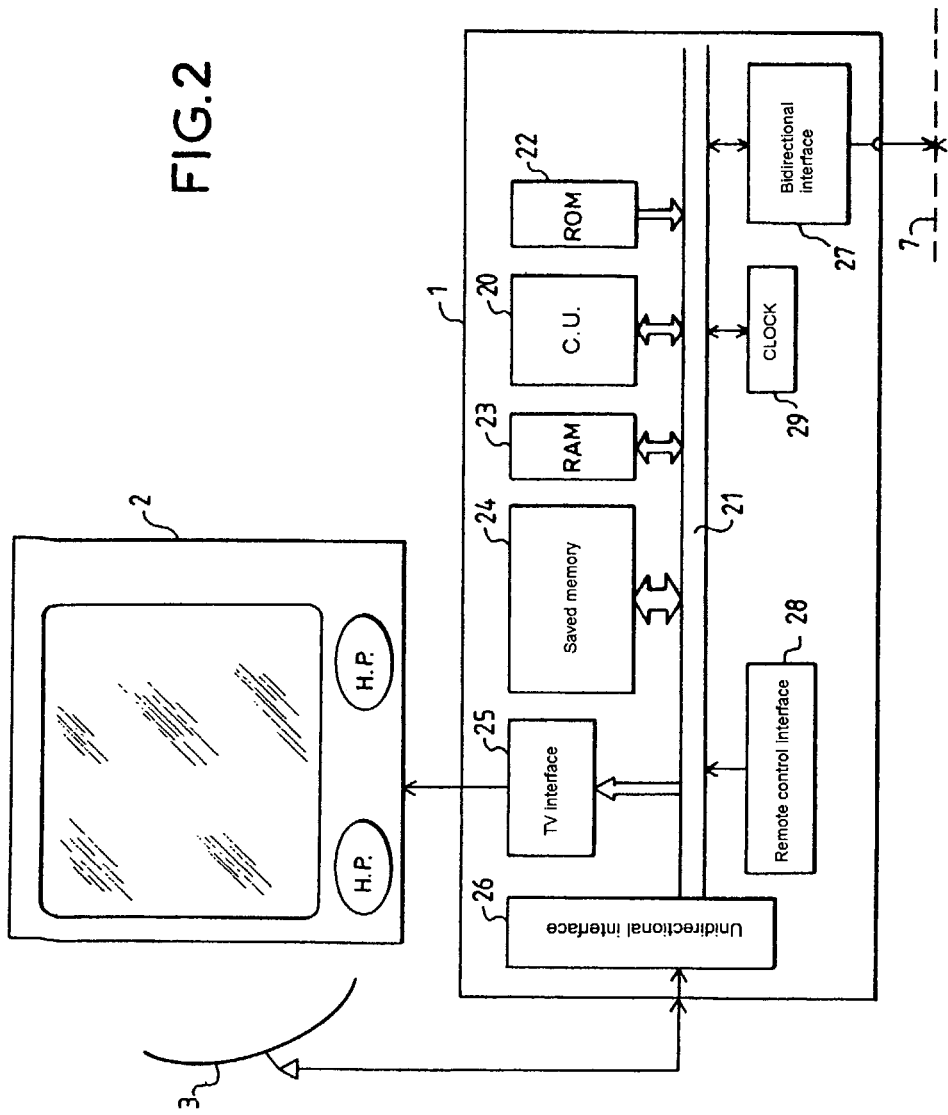
FIG. 2 represents a schematic diagram of television decoders implementing the invention.

The diagram of FIG. 2 shows an example of the structure of a decoder (1) according to the invention. The decoder (1) comprises a central unit (20), for example a microprocessor or a specialized circuit, connected to the other elements by an internal communication bus (21). The main elements connected to the bus are: a program read-only memory (22) containing among other things the program which can be executed on power-up, a RAM type work memory (23), a programmable nonvolatile memory (24) containing data (for example, downloaded screen pages) and/or executable code (for example, update data), a connector such as a SCART socket (25) for communicating with the television, a unidirectional communication interface (26) for receiving and processing the signals received by the antenna (3), a bidirectional communication interface (27) (typically a modem linked to the telephone network) which is linked to the return path and an infrared receiver (28) receiving in a known manner signals from a remote control. The decoder comprises a clock (29) which can be updated by data downloaded from the network. According to another embodiment, the decoder is integrated into the television, thereby enabling it to use certain modules already present, such as the tuner and/or the infrared receiver (28) with its remote control.

The decoders originating from various manufacturers have various hardware and software configurations, and have different capacities. This is why they are identified with the aid of an identifier, comprising two fields. This identifier is in write-prohibited memory, of ROM type for example. A first field contains the reference of the maker of the decoder. A second field contains the type of decoder. These two fields are located in the program read-only memory of the decoder.

The update data dispatched over the broadcasting network are destined for a certain model of decoders, this is why these data are associated with a decoder identifier or an identifier of a model of decoder. Before performing the acquisition of the update data which are being dispatched over the broadcasting network, a decoder must verify beforehand whether they are destined for it. To do this, the decoder must check that its version identifier and maker identifier have a value which is equal to (or at least compatible with) those located in the update data. It is also possible to store an identifier in a removable medium such as a chip card. This identifier can also contain a subscriber number.

In order to advise the decoders of the sending of new update data, the communication center firstly dispatches announcement signals then the update data. Only the decoders which have correctly received announcement signals can update themselves.

Figures 3, 6:
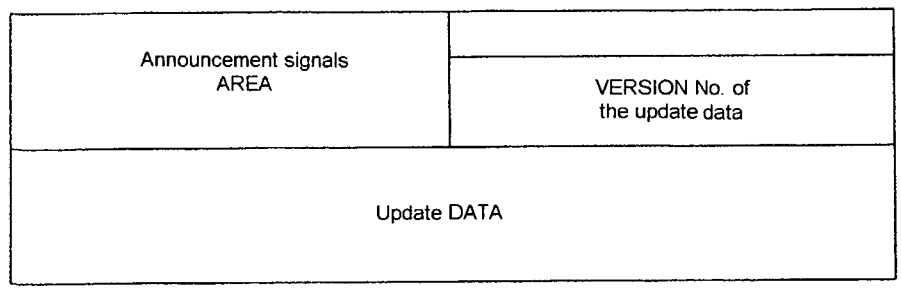
FIG. 3 shows the data of an announcement signal according to a preferred mode of the invention.
FIG. 6 represents a part of the content of the programmable nonvolatile memory of a decoder according to the invention.

An exemplary announcement signal is presented in FIG. 3.

An announcement signal consists of a data block comprising at least:
the identifier of the decoder or of the model of decoders targeted, in the example: TA,
an identifier of the data comprising a version number, in the example: V3,
at least one data dispatch time interval, or one or more instants of dispatch, in the example: $TD1_A$, $TF1_A$,
information for pinpointing the update data, in the example: RZ3,
an indicator of state of campaign on the broadcasting network, in the example, it possesses the value "ON".

The data pinpointing information specifies the means allowing the decoder to find the update data. If this means is the broadcasting network, the announcement signal contains the symbol "RZ" followed by a channel number. This means may also be the telephone network, the signal then containing a telephone number (symbol "TEL") followed by a ten-digit telephone number. This means can also be a network, for example INTERNET, the signal then specifies the symbol "IP" followed by the character string corresponding to the address of the server. For example, if the update data constitute an interactive service which can be extracted from the base of a remote server, the pinpointing information may be a data item known by the acronym URL (standing for "Uniform Resource Locator"), which constitutes the address at which the data are located in the server. The announcement signals can contain other information such as text, references for accessing a network (HTML), or even an interactive service.

The dispatch time intervals are defined by the time of the first dispatch of data (hour-minute-second) and the time of the last dispatch of data. If the first dispatch of announcement signal and the last dispatch of update data are separated by more than 24 hours, then a date (day and month) must be added. If the pinpointing information specifies the return path, the announcement signal does not comprise any dispatch time interval. The center can in fact be called at any moment by the return path. Advantageously, the center determines the time intervals for the dispatches of update data at instants at which the decoders are generally less often used. Thus, it is preferable for the dispatching of the update data to be performed at night.

A variant consists in specifying the instants of start of dispatch of each session rather than a time interval of dispatch of the sessions. This variant allows fine programming of the decoder since it can lock onto a precise instant. It can be envisaged above all when the dispatch instants are not numerous, otherwise the size of the announcement signal would be too big.

The fifth field called "indicator of state of the campaign on the broadcasting network" or more simply "campaign indicator" is a flag indicating whether the data announced are broadcast and whether these are the last broadcasts. The center may be disturbed by unscheduled events such as the dispatching of interactive services and abruptly no longer be able to dispatch the scheduled data. The indicator makes it possible to inform the decoders of the halting of the broadcasting of data and to forewarn them of the next end of a campaign. The indicator takes three values:

"STB" (coded "0"), the announced data are no longer broadcast.

"ON" (coded "1"), the announced data are broadcast.

"END" (coded "2"), the announced data are the last ones broadcast.

An announcement signal with the indicator at "STB" can possess dispatch intervals, thereby allowing the decoders to prepare themselves to download during specified intervals provided that meanwhile an announcement signal with the indicator at "ON" has been broadcast.

The dispatching of the data of the announcement signals and of update data can be performed according to four different scenarios as a function of their chronology and of the transmission means used.

1.—The announcement signals and the update data are dispatched on the same channel of the broadcasting network. The update can be performed immediately or later.
2.—The announcement signals are dispatched on several broadcasting channels and the update data on a single channel. The update can be performed immediately or later.
3.—The announcement signals are dispatched on one or more broadcasting channels and the update data on the return path. This case occurs for example when decoders have been constantly invoked by the user or were unplugged. They were then unable to download the update data through the broadcasting network. They can thus, on the occasion of a connection with the center, request a downloading of the data via the return path, once the announcement signals have been received.
4.—The announcement signals and the update data are dispatched on the return path. This case occurs when for example the communication center decides not to allot any bandwidth to the announcement signals on the broadcasting network. So on the occasion of a connection with the center via the return path, the center sends an announcement signal to the connected decoder.

The first two scenarios make it possible to update the great majority of decoders, the last two relate more to a minority of decoders. The four scenarios will now be explained.

Figure 4:
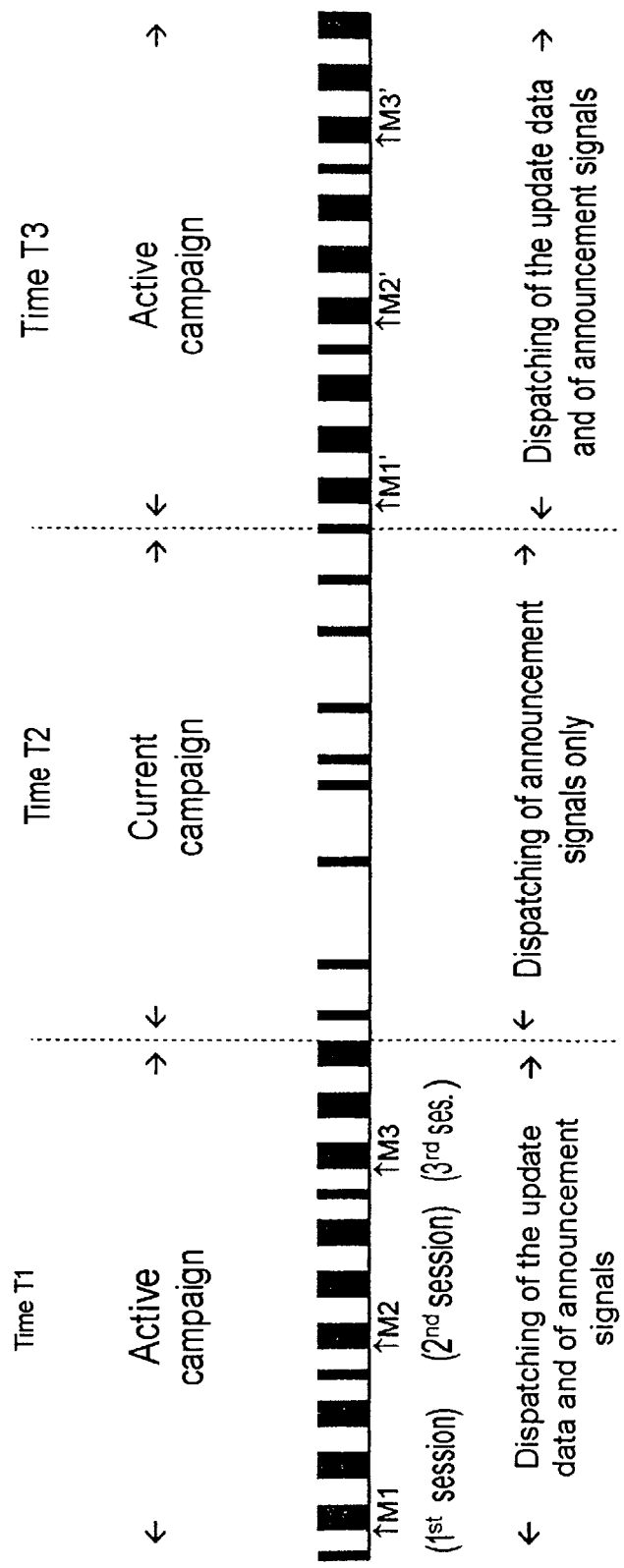
FIG. 4 shows the chronology of the signals dispatched by the center according to a first embodiment of the invention.

The diagram of FIG. 4 shows the chronology of the signals dispatched by the center on a specified channel of the broadcasting network according to the first scenario. The campaign indicator in all the announcement signals is at "ON".

Initially—time T1, the campaign is said to be "active". The update data are dispatched on the broadcasting network at instants M1, M2 and M3 which belong to the time interval specified in the first announcement signal. In FIG. 4, the announcement signals are represented by a narrow line and the data by thick lines. The first signal specifies the next dispatch of the data sessions at the instants M1, M2 and M3. At the instant M1, a first data session is broadcast. A session is represented by several thick lines, thus showing the consecutive dispatching of several data packets, representing one or more times the entirety of the update data (cyclic broadcasting of the data). Then a second announcement signal is dispatched, announcing the next dispatching of the sessions at the instants M2 and M3, and so on and so forth. The announcement signals may be dispatched at any moment except between two packets of one and the same session.

Subsequently, only the announcement signals are broadcast, they specify the time interval corresponding to the next dispatches of update data (M1', M2', M3'). The campaign is said to be "current". This second time makes it possible to allot bandwidth to other data streams. Subsequently still, the campaign becomes active again.

Figure 5:
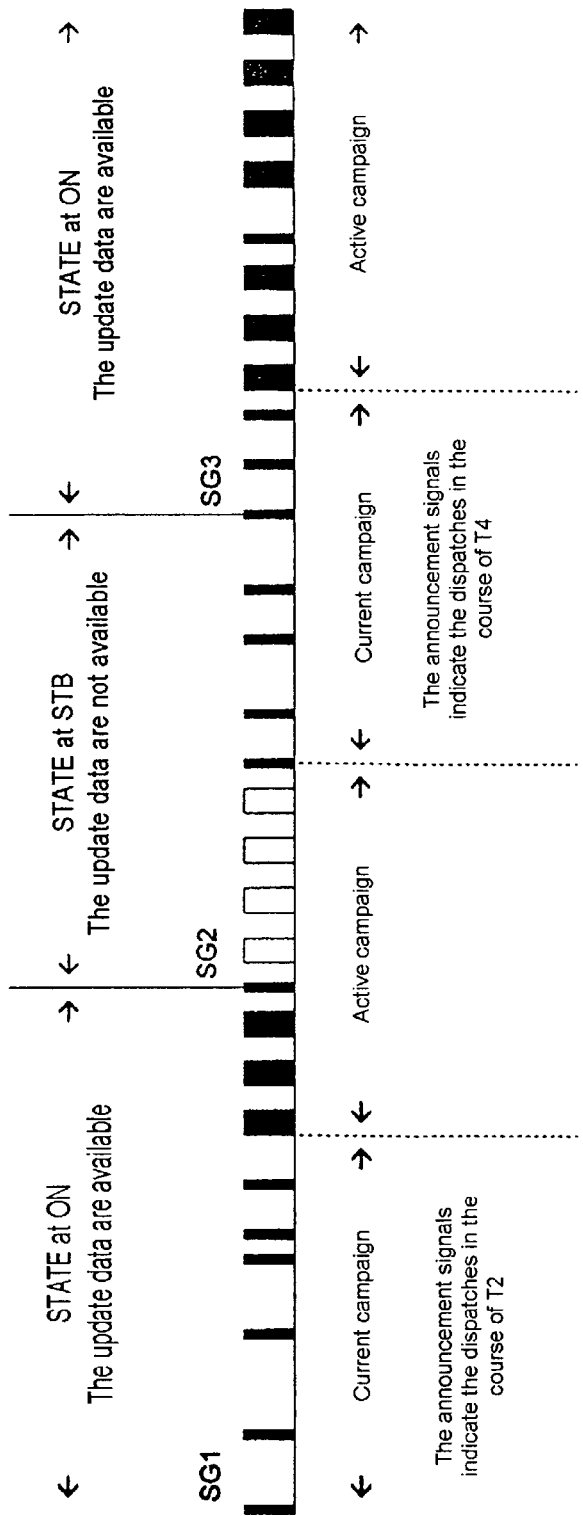
FIG. 5 shows the chronology of the signals dispatched by the center according to of the use of an indicator for halting the dispatches broadcast.

The diagram of FIG. 5 shows the influence of the change of value of the indicator in the course of a campaign. The first announcement signal dispatched (SG1) and those which follow it possess a campaign indicator at "ON". The campaign is firstly current then active (the update data are broadcast). At a certain moment, the center can no longer dispatch other data sessions, so it sends an announcement signal (SG2) with the indicator at "STB". From this moment onward, the update data which ought to have been sent are represented by empty lines in FIG. 5. At these moments, other information is broadcast. Several announcement signals with the same value of the indicator are sent so as to forewarn certain decoders which may not have been listening in during SG2. Finally, onward of the announcement signal (SG3), all the signals possess a campaign indicator at "ON". The decoders are then forewarned of the resumption of the update campaign and can, at the start of the specified time interval, begin receiving the data.

We shall now study the behavior of the decoder. When it is switched on, the decoder continuously analyzes the signals received by the broadcasting channel. This analysis is carried out by the transport software layer. This layer detects the announcement signals, the update data and the other messages.

An announcement signal dispatched by the center is incorporated into a data packet. The decoder receives the packet and the transport layer detects an announcement signal composed of the five data items previously described. It compares the identifier of the decoder (the maker's reference and the type of decoder) transmitted and that recorded in its memory. If the identifiers are different, the announcement signal is ignored. If the identifiers are identical, the decoder is indeed the addressee of the data of the announcement signal and of the associated update data.

In this case, the decoder analyzes the identifier of the data and extracts therefrom the version number which it compares with a version number stored in nonvolatile memory. If the version numbers are identical, then the decoder is already furnished with this version of update data, there is therefore no need to effect a new download. If this number is different, the decoder writes the information contained in the announcement signal to a nonvolatile memory area termed the "announcement signals area". The data of the most recent announcement signal overwrite those of the signals received previously, so that only a single announcement signal exists in the memory.

The nonvolatile memory of a decoder comprises at least the areas indicated in FIG. 6.

The actual updating of a decoder should preferably not impede its nominal operation. Thus, this update occurs, according to the present exemplary embodiment, preferably when the user is not using the interactive functions of the decoder and, in general, when the decoder is not being invoked by the user. The most favorable instant is usually at night. Each time the decoder ceases to be used, it reads the content of the announcement signals area. If this area is empty, no signal has been received since the last update, the following steps are not executed and the program can perform other tasks.

If the announcement signals area is not empty, the decoder reads the data of the announcement signal and determines whether it is in the specified time interval. To do this, it compares the current time with the start and end of dispatch times. If the end of dispatch time has passed, it is too late to perform the update. If the start of dispatch time has not been reached, the decoder can perform other tasks. It can also place itself in standby mode and program a wake-up a few instants before the start time. If the current time is in the interval, the decoder can receive the data according to the means specified in the announcement signal. Let us firstly examine the case or the signal indicates that the data are available on the broadcasting network. The case relating to the bidirectional link will be examined further on in the present description.

In the course of the time interval specified in the announcement signal, the decoder begins listening, via is unidirectional communication interface (26), to the specified broadcasting channel. Almost the entire resources then being devoted to the download, its user-side possibilities are greatly reduced. Thus, all interactivity is prohibited, as also is the video and/or the audio for certain models. The decoder analyzes each packet read and extracts those corresponding to update data. It then compares the data identifier received with that stored in the announcement signals area. If they are equal, the data are indeed those announced. The decoder then writes the content of the data to the nonvolatile programmable memory.

When the update has been performed, the decoder updates the version number contained in its nonvolatile memory. This new version number avoids the need for the decoder to carry out an update with the aid of the same version and hence of the same data. Thereafter, the decoder also sets the announcements area to zero. This area will thus be declared empty upon the next power-up. Finally, the decoder sends a signal of proper running of the update operation to the communication center. This signal is sent via the return path. If the update data are dispatched via the broadcasting network, the decoder can either immediately perform a connection to the "point-to-point" network in order to send the signal of proper running of the update, or store it and send it upon a subsequent connection via the return path.

Advantageously, this signal can contain the time of the actual update of the decoder. Thus the center can produce statistics regarding the moment at which the decoders update themselves via the broadcasting network.

The update data can be dispatched one or more times. If they are dispatched several times, the chances of reaching the decoders at an instant at which they are available are multiplied, this making it possible to update the maximum number of decoders.

An example of the running of an update campaign is now presented. Consider two models of decoders: A and B, each decoder model having its own identifier value. The group of decoders of model A possesses the update data version number 2 ("V2") and the group of decoders of model B has the update data version number 5 ("V5"). The aim of the campaign is to perform the updating of the two groups, the decoders A receiving version 3 ("V3") and those B the version 6 ("V6").

The collection of decoders can be shown schematically by the diagram of FIG. 7-*a*. The update campaign commences with the sending of the announcement signals. The announcement signal represented in FIG. 8-*a* is a block comprising two groups of data, the first in respect of the decoders of type A and the second in respect of the decoders of type B. It is thus possible to dispatch two separate announcement signals, the first corresponding to the decoders A and the second to the decoders B. The values indicated in FIG. 8-*a* indicate that the update data corresponding to version 3 which are destined for the decoders A will be available in the course of the time interval [$TD1_A$, $TF1_A$] on broadcasting channel number 3. The update data corresponding to version 6 which are destined for the decoders B will be available in the course of the time interval [$TD1_B$, $TF1_B$] on broadcasting channel number 5.

This announcement signal is repeated identically a certain number of times. In their memories, the decoders A record the number of the version (V3), the time interval of dispatch [$TD1_A$, $TF1_A$] and the means of accessing the update data: channel 3 of the broadcasting network. In their memories, the decoders B record the number of the version (V6), the time interval of dispatch [$TD1_B$, $TF1_B$] and the means of accessing the update data: channel 5 of the broadcasting network. The decoders then await the first dispatch time, $TD1_A$ for the decoders A and $TD1_B$ for the decoders B.

If the decoder is not fitted with a clock capable of waking the central unit up, it can monitor the broadcasting network and look out for the arrival of the update message. During this time, the unused parts of the decoder may be in low consumption mode (the display for example). Otherwise, the decoder can program the clock to trigger a wake-up a short time before the start of the time interval specified in the announcement signal, then the entire decoder can go to standby mode. If the announcement signal does not contain a time interval but instants of dispatch, the decoder preferably chooses the first in chronological order.

The update data are sent during repetitive sessions. In the example, the data destined for the decoders A are dispatched three ties at the instants $M_A1$, $M_A2$ and $M_A3$ and the data destined for the decoders B are dispatched four times at the instants $M_B1$, $M_B2$, $M_B3$, $M_B4$. It is preferable not to alternate the dispatchings of the signals for the terminals A and B, since, as will be seen hereinbelow, a connection with the center by the VR may be requested indicating the proper updating of the decoder. If the dispatchings for the terminals A and B are alternated, fairly quickly the decoders A and B will update themselves and want to connect up via the VR. This risks overloading the communication at the level of the center. It is therefore advisable to update the maximum number of terminals A before initiating the campaign for the terminals B.

After the first dispatching of the data destined for the decoder A (in the example: after the instant $M_A1$), let us assume that the state of the decoders is that represented in FIG. 7-*b*. Slightly fewer than half the decoders have been updated. After the dispatching of the data of the instant $M_A2$, there are more decoders A with the new version (V3) than decoders with the old version (V2). The state of the decoders is illustrated in FIG. 7-*c*. Some time before the broadcasting of the last update data, the center dispatches announcement signals with the value of the indicator at "END". The decoders are thus informed that the last update data are going to be dispatched. Each decoder informs the user of this fact via a message on the television screen or on the display of the decoder or any other means of display. The user thus has the possibility of ceasing the use of his decoder so as to allow it to update itself via the broadcasting network. After the last dispatching of the data destined for the decoders A, there remains only a very small number of them which have not been updated, the state of the decoders is illustrated in FIG. 7-d.

After the first dispatching of the data B (in the example: after the instant $M_B1$), the state of the decoders is illustrated in FIG. 7-e. After the last dispatching of the data destined for the decoders B (in the example: after the instant $M_B4$), as shown by FIG. 7-f, there still remains a certain number of decoders which have not been updated.

It was stated previously that following a correctly performed update, each decoder sends a signal of proper running of the operation to the communication center. This signal is sent via the return path. The communication center stores and processes these signals. It determines approximately, given the inertia of the responses, the quantities of decoders furnished with the old and with the new version.

The communication center then analyzes the effectiveness of the campaign performed and determines the number of decoders still to be updated. For the decoders A, the number is low, their updates will be performed via the return path either during a communication engendered by the center, or during a later communication engendered by the user. For the decoders B, the number is too big to perform an individual update via the return path, the center then decides to perform a new update campaign via the broadcasting network. This new campaign begins with the sending of the announcement signal whose data are represented in FIG. 8-b. In the course of the new time interval [$TD2_B$, $TF2_B$], the update data for the decoders B are available on the broadcasting network.

At the end of this new campaign, the number of decoders still to be updated is low and their updating via the return path is therefore possible. The center then sends the announcement signal represented in FIG. 8-c indicating the end of the dispatching of the data on the broadcasting network. The terminals which are not yet up to date can connect up with the aid of the return path.

The downloading of the data via the return path will be described in the third scenario.

As a variant, if, in the course of a campaign, the communication center realizes that a large number of decoders is updated and that the remaining decoders may be so via the return path, a signal indicating a premature end of dispatching of update data can be sent before the last time of dispatch initially scheduled. This signal can be specific or take the format of an announcement signal. In this case, this announcement signal contains a shorter time interval than the previous one, thus eliminating the last updates initially scheduled. This variant avoids the need for data which will be useful to few decoders to be sent over the broadcasting network.

Advantageously, the dispatchings of the announcement signals and of the update data may be concomitant. It is for example possible to alternate on the broadcasting network the dispatchings of announcement signals and of update data sessions. Leaving aside the problems of reception (impairment of data for example), it is possible to send a single announcement signal followed immediately by the broadcasting of a single data session. In fact, the continuous broadcasting of announcement signals ensures that a maximum number of decoders is forewarned of the next dispatch of data. It may be seen in FIG. 4 that announcement signals are dispatched between the instants of dispatch M1, M2, M3 of the sessions. The interposing of announcement signals between dispatches of update data has the advantage of updating the decoders which are available right from the first instant indicated in the signal, the dispatching of the update data following the announcement signal immediately.

A variant embodiment consists in storing several announcement signals in the memory. The announcement signals possessing a lapsed window or of which all the dispatch instants have passed are automatically erased. Only the announcement signals having dispatch instants subsequent to the present moment are taken into account.

An improvement of the first scenario consists in dispatching the announcement signals on several broadcasting channels. This is the second scenario, it makes it possible to advise a maximum number of decoders that the update data will be dispatched on a specific channel, since, the announcement signals requiring little bandwidth, they hardly degrade the performance of the channels on which they are dispatched. For example, the announcement signal represented in FIG. 9 is dispatched identically on channels 1, 2 and 5. This announcement signal specifies that version 3 of the update data will be available on channel 4 in the time interval [$TD1_i$, $TF1_i$].

The decoders Ti which receive channels 1, 2 and 5 process this announcement signal. If they need version 3, they can monitor channel number 4 between the instants $TD1_i$ and $TF1_i$ and effect the acquisition of the data. The change of channels is performed automatically if the decoder is not used by the user. Otherwise, at the instant M1, the decoder suggests the download to the user, by performing a change of channel. The user can accept or refuse the download. In the latter case, the decoder will propose a download again at the instant M2.

According to a variant, if this is not an end of campaign (the campaign indicator does not have the value "END"), the decoder does not inconvenience the user and waits for him to cease using it in order to proceed with the download. The decision to download is then taken solely by the decoder, the user may not be aware of it. On the other hand, if the announcement signals indicate the end of a campaign, the download must be proposed to the user by indicating to him for example that if he does not do it the update will have to be performed via the return path.

As in the first scenario, at the end of the download the decoders dispatch a signal of proper running at the end of the operation.

It may happen that a decoder is invoked constantly by the user or is unplugged, in all cases it cannot download the data dispatched over the broadcasting network. The third scenario will allow it to perform the download via the return path. It therefore profits from a connection with the center via the return path. During this connection, the reason for which may be, for example, the execution of an interactive service requested by the user, the decoder dispatches a signal requesting the sending of update data.

Figure 10:
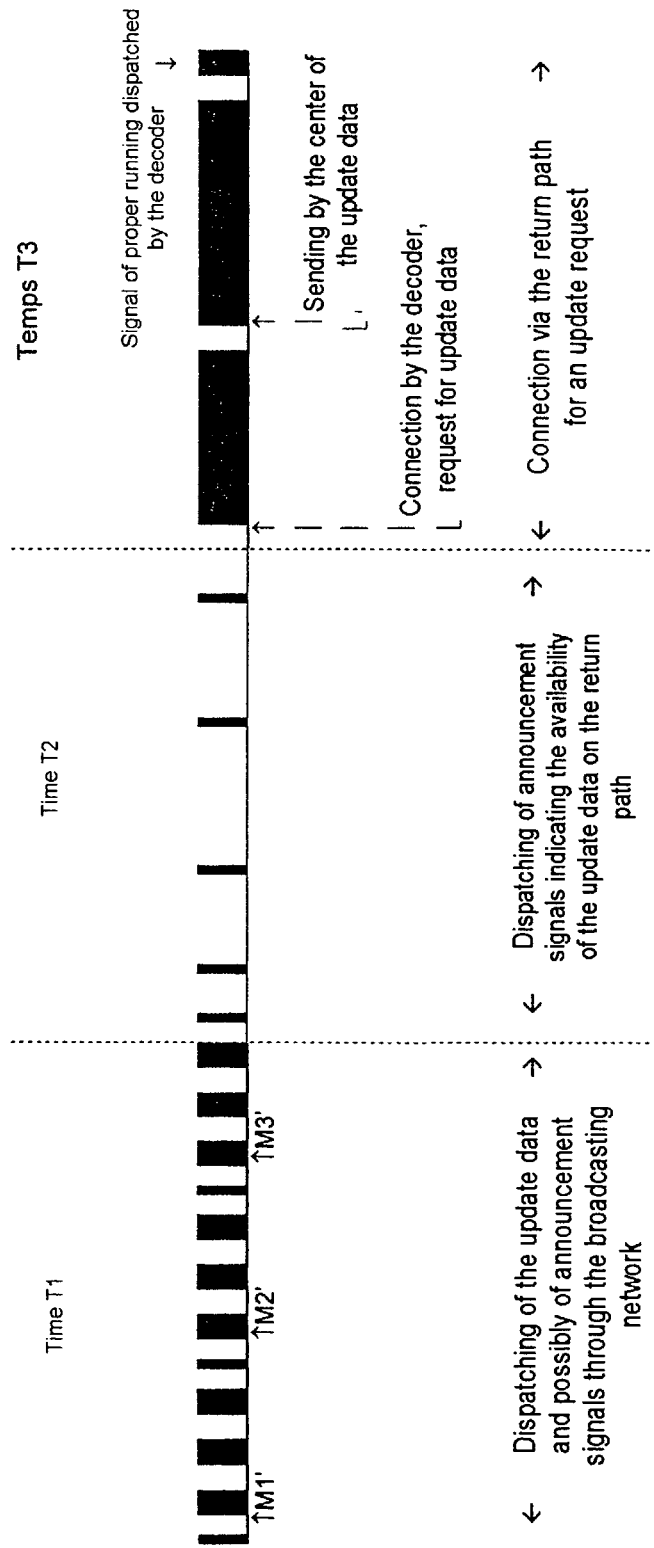
FIG. 10 shows the chronology of the signals exchanged between the center and a decoder according to a second mode of the invention.

The diagram of FIG. 10 shows the chronology of the signals exchanged between the center and a decoder according to the third scenario. Initially—time T1, the update data are accessible on the broadcasting network. Certain decoders cannot update themselves on completion of this time. Thereafter, in the course of the time T2, the dispatching of the update data is halted on the broadcasting network and the announcement signals indicate that the data are hence also available through the bidirectional return path. At the start of the time T3, the decoder connects up to the center. It can do so either solely for the downloading of an update, or to request, on the initiative of the user, an interactive service and at the end request the download. In both cases, in the course of the connection the decoder dispatches a request asking for an update. The center then sends the update data. At the end of the download, a signal of proper running is sent by the decoder thus advising the center of its update.

It may happen that the bandwidth is very congested by other signals of higher priority than update data and announcement signals and that there is no longer any bandwidth to allot to this type of information. It may also happen that the decoder is not connected to a channel broadcasting announcement signals and that on the occasion of a connection it realizes that an update is necessary. It may then ask the center to send it an announcement signal via the bidirectional path. According to a fourth scenario, which is an enhancement of the invention, the decoder uses the return path to dispatch both the announcement signal and the update data.

Figure 11:
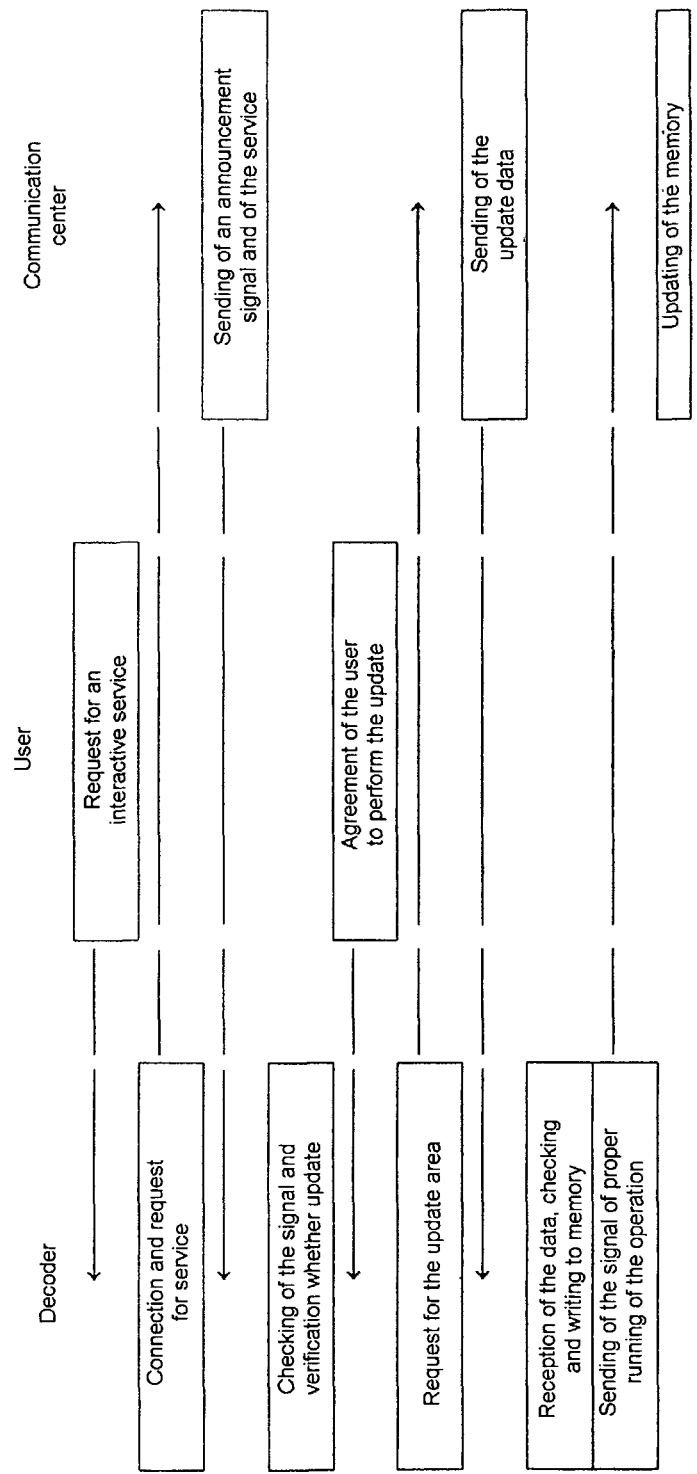
FIG. 11 shows the chronology of the signals exchanged between the center and a decoder according to a fourth embodiment of the invention.

The diagram of FIG. 11 shows the chronology of the signals exchanged between the center and the decoders according to this fourth scenario. On the initiative of the user, the decoder connects up to the communication center so as to request for example an interactive service. The center answers by sending an announcement signal and the service requested. The decoder recognizes the sending of an announcement signal and checks whether it needs an update. If such is the case, it forewarns the user of an update in progress. The user can accept the update or postpone it until the end of the execution of the interactive service. When the decoder is ready to receive the update data, it sends a request to the center. The center then dispatches the update data. Once the data have been received and correctly written to memory, the decoder sends a signal of proper running of operation and disconnects. The center updates its memory by indicating that this decoder has just been updated with a new version of data.

The advantage of this fourth scenario is that the decoder to be updated is targeted perfectly. Specifically, it was stated previously that the center knows approximately, given the inertia of the sendings of signals of proper running, the version contained in the memory of each decoder. On the occasion of a connection via the return path, the center verifies whether this decoder needs a new version. If such is the case, it dispatches an announcement signal suggesting to the decoder that it update itself. The decoder compares the version number dispatched and that in memory. Specifically, the center may not have received the signal of proper running and make this request wrongly. If the decoder does not need an update, it indicates this to the center which then updates its memory. If it needs an update it asks the center to perform the scenario described previously.

An improvement of the present invention is represented by a fifth scenario. The latter relates to decoders which are much invoked by their users and which do not have the possibility of effecting the acquisition of announcement signals. In this case, on the occasion of a connection with the center on the initiative of the decoder, the center transmits an announcement signal indicating that update data are currently being broadcast on the broadcasting network. The decoder is then informed of the dispatch and can advise the user that he can update his decoder. The user can then cease using his decoder for the time of the operation.

A variant of this scenario consists in the data broadcast on the network having an enciphered component which renders the audio-visual information unutilizable by anyone not having the deciphering key. This key will allow the decoders which possess it to decipher the update data and to render them usable. The announcement signal being transmitted individually to each decoder via a specific connection, this signal can contain the deciphering key. Beforehand, the user has taken care to acquire the right to receive this key, by paying a sum of money for example.

A variant consists in taking into consideration an impairment of the data downloaded into the memory. In this case, the data no longer being usable, new ones must be downloaded, this being the "backup re-update". The decoder in trouble analyzes the information dispatched through the broadcasting network and receives the announcement signals corresponding to its model. It can thus determine the software version which it needs, as well as the means of acquiring it and at what moment it can perform the download. If the campaign is active, it can download the data immediately. If the campaign is current, in a similar manner to the third scenario, it performs a connection with the center and downloads the update data through the return path. The factor triggering the backup update can also be the receiving at the user's premises of a new decoder which possesses a blank memory.

According to this variant, the announcement signal possesses an additional field such as shown by FIG. 12. This field specifies the means making it possible to download the data through the bidirectional link (telephone network, address of network such as INTERNET, etc.). The data according to the exemplary announcement signal of FIG. 12 are dispatched over the broadcasting network (on the channel RZ3) and, in the event of a backup, the decoder can connect up to the number represented by "TEL" in order to receive them.

Figure 13:
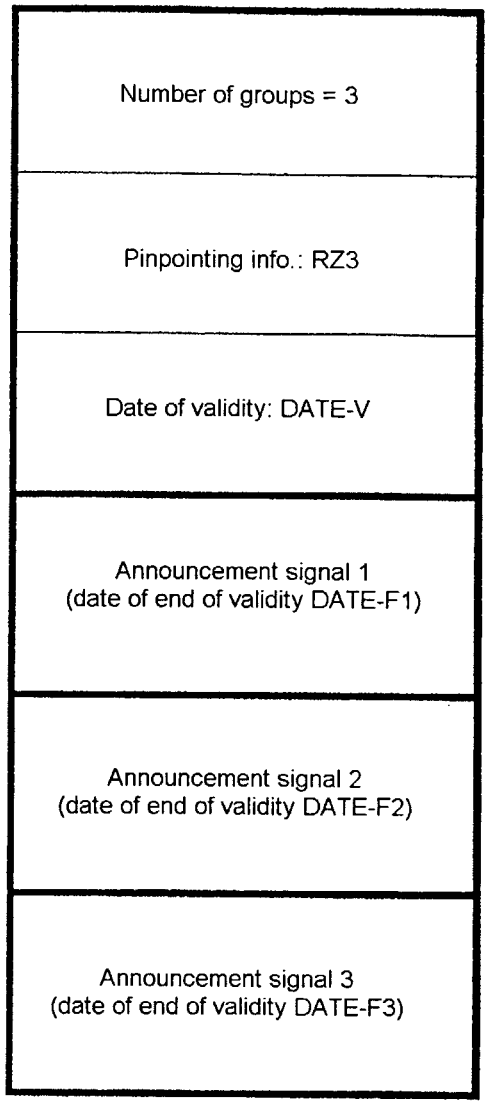
FIG. 13 shows the data of a table composed of several announcement signals according to a variant of the invention.

An enhancement of the invention consists in including a date of validity and/or a date of end of validity within the announcement signal. The data of validity makes it possible to grant the user access to the data downloaded only onward of the specified date. The end of validity date makes it possible to remove the user's access to the downloaded data. The downloaded data may thus be erased from the memory, thereby freeing some space. Advantageously, if the decoder receives a validity signal whose end of validity date has already passed, it disregards this announcement signal. According to a variant, if one or more elements of several announcement signals are identical, it is possible to group them together in a table furnished with a header. This header contains the values common to all the announcement signals of the table. FIG. 13 shows a table comprising three announcement signals corresponding to the dispatching of three data groups numbered 1, 2 and 3. The pinpointing information (RZ3) and the dates of validity (DATE-V) are identical for the three data groups and are grouped together in the header. The different values such as the end of validity dates (DATA-F1, DATA-F2, DATE-F3) remain in each announcement signal.

It should be noted that the present invention applies equally well within the realm of analog televisions and within the realm of digital televisions.

The invention claimed is:

1. A process for transmitting update data by a communication center to a plurality of terminals, said process comprises the steps:
broadcasting of an update campaign through a broadcast network, the broadcasting consisting of dispatching announcement signals which are transmitted before update data;
formulating of a bi-directional communication, along a bi-directional channel distinct from the broadcast network, between the communication center and at least some of the terminals, each terminal transmitting an indication of a state of the update to each respective terminal to the communication center;

determining at the communication center, the number of terminals actually updated as a function of the number of terminals being updated, being halted, or terminals triggered by a new update campaign;

launching, by a terminal from said at least some of the terminals which is coupled to said bi-directional communication link during which an announcement signal is transmitted from the communication center to said coupled terminal, said announcement signal indicating that update data is available through said bi-directional communication link, and receiving update data through said bi-directional link when said coupled terminal is a non updated terminal after the end of said new update campaign.

2. The transmission process as claimed in claim 1, wherein the bi-directional communication occurs on the initiative of a terminal outside of the update campaign, said terminal transmitting an absence of update indication at the request of the communication center.

3. The transmission process as claimed in claim 1, wherein the update data depend on the type of terminal, the determining of the updated terminal at the level of the communication center is performed as a function of each type of terminal.

4. The transmission process as claimed in claim 1, wherein the new update campaign is triggered as a function of the proportion between the number of terminals updated and the number of terminals not updated.

5. The transmission process as claimed in claim 3, wherein the new update campaign is triggered as a function of the proportion between the number of terminals updated and the number of terminals not updated.

6. A process for receiving announcement signals and update data transmitted by a communication center to terminals comprising the steps:

broadcasting by the communication center an update campaign through a broadcast network in the course of which some terminals receive and store the update data such that said update campaign comprises a transmission of an announcement signal before an update data is transmitted;

a step of transmission from a receiver, subsequent to the actual updating of a terminal, to the communication center of a signal of proper running of the operation, and a step of emitting to the communication center, from a non-updated terminal through a bi-directional communication link distinct from the broadcast network, a request of downloading of the update data and a step of reception of the update data in said non updated terminal through said bi-directional communication link, the announcement signals indicating that said update data is available through said bi-directional communication link.

7. The reception process as claimed in claim 6, wherein the update data contain an indication of the type of terminal, and in that the update in a terminal is performed if said indication corresponds to the type of this terminal.

8. A communication center for transmitting announcement signals and update data for a plurality of terminals, comprising:

a memory containing update data, a means of broadcasting the update data through a broadcast network for a specified duration;

a means of bi-directional communication distinct from the broadcast network with at least some of the terminals receiving from each terminal an update performed signal, said means of bi-directional communication receiving a request for update by a terminal not updated and sending the updating data to the terminal that is not updated, the announcement indicating that update data is available through said bi-directional communication link, wherein said update data is transmitted after said announcement signal is transmitted;

a counter for determining the number of signals received;

a comparator triggering the broadcasting means so as to broadcast the update data once again when the value of the counter is less than a specified number, the comparator activating the means of bi-directional communication with at least one terminal not updated so as to transmit the update data to the at least one terminal that was not updated by the broadcasting means.

9. The communication center as claimed in claim 8, comprising, in memory, data blocks corresponding to types of terminals liable to process them, and counters corresponding to each type of terminal, each counter determining the number of the update performed signals on each terminal corresponding to its type, the comparator triggering the broadcasting of the data block whose type corresponding to that of the counter.

10. The communication center as claimed in claim 8, for which the comparator takes into account the proportion between the number of terminals updated and the number of terminals not updated.

* * * * *